(12) United States Patent
Cabot et al.

(10) Patent No.: US 6,597,853 B2
(45) Date of Patent: Jul. 22, 2003

(54) DEVICE PACKAGING AND METHOD

(75) Inventors: Steven Cabot, Edison, NJ (US); David Stephen DeVincentis, Flanders, NJ (US); Arturo Hale, New York, NY (US); Sandra Greenberg Kosinski, Murray Hill, NJ (US); Salvatore J Messana, Queens, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 130 days.

(21) Appl. No.: 09/746,922

(22) Filed: Dec. 21, 2000

(65) Prior Publication Data

US 2003/0103753 A1 Jun. 5, 2003

(51) Int. Cl.[7] .............................. G02B 6/00
(52) U.S. Cl. .................................. 385/135
(58) Field of Search ............... 385/134, 135, 385/43, 96, 97, 98, 99, 49, 38, 123; 359/341.1; 372/6, 36

(56) References Cited

U.S. PATENT DOCUMENTS

| | | | |
|---|---|---|---|
| 5,179,610 A | * | 1/1993 | Milburn et al. ............... 385/92 |
| 5,418,880 A | * | 5/1995 | Lewis et al. ................ 385/123 |
| 5,530,710 A | * | 6/1996 | Grubb ........................... 372/6 |
| 5,864,644 A | | 1/1999 | DiGiovanni et al. .......... 385/43 |
| 5,873,923 A | * | 2/1999 | DiGiovanni ................. 65/390 |
| 5,949,941 A | * | 9/1999 | DiGiovanni ................. 385/127 |
| 5,953,353 A | * | 9/1999 | Headley et al. ................ 372/6 |
| 5,966,491 A | * | 10/1999 | DiGiovanni ................. 385/127 |

* cited by examiner

*Primary Examiner*—Tulsidas Patel
(74) *Attorney, Agent, or Firm*—Julio A. Garceran

(57) ABSTRACT

A packaging system includes a medium which transports energy in a first form away from a radiation point in a device to where the energy can be converted to a second form without damaging the device or effecting other devices. In certain embodiments, the medium can inhibit the propagation of energy in the second form. For example, in an optical coupling device, the medium includes a substrate adjacent to the radiation point which transports light energy away from the radiation point to a housing which converts the light energy into thermal energy away from the radiation point. In accordance with another aspect, the packaging system suspends at least a portion of the device, for example, to protect the device against a third form of energy. For example, in the optical coupling device, the medium includes an air gap which separates the radiation point from the substrate to suspend at least a portion of the device. The air gap enables the device to be protected against the mechanical energy resulting from the expansion or contraction of the packaged device due to changing temperature. In certain embodiments, the housing is provided with at least one opening in which a pliable seal is inserted which can absorb the mechanical energy resulting from the expansion or contraction of the packaged device due to changing temperature.

20 Claims, 3 Drawing Sheets

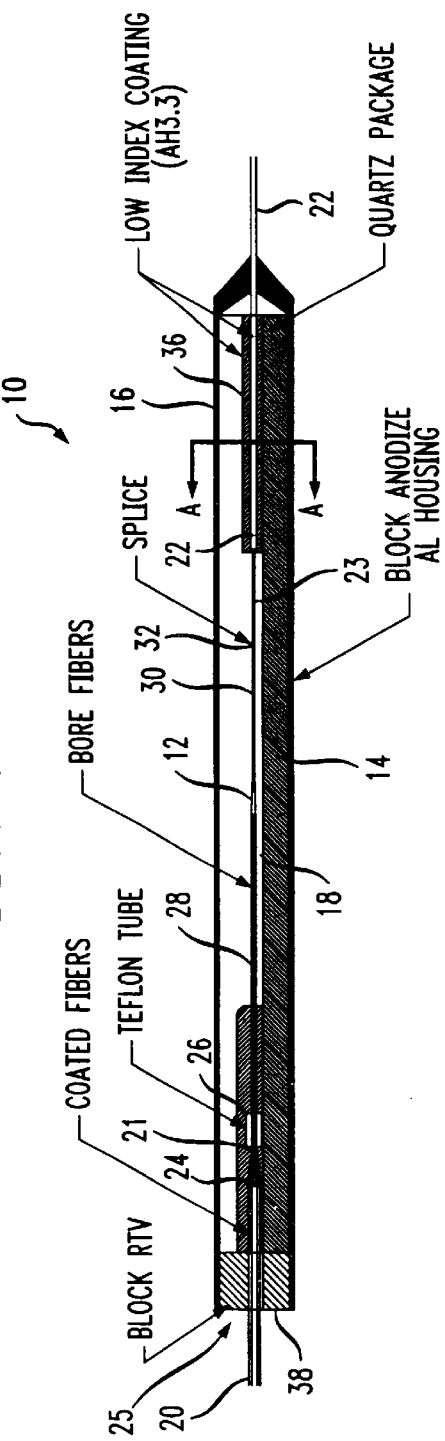

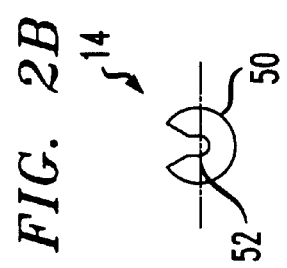
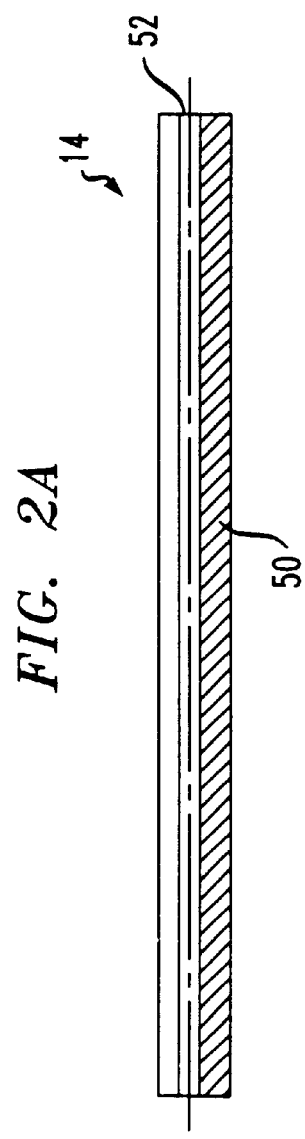

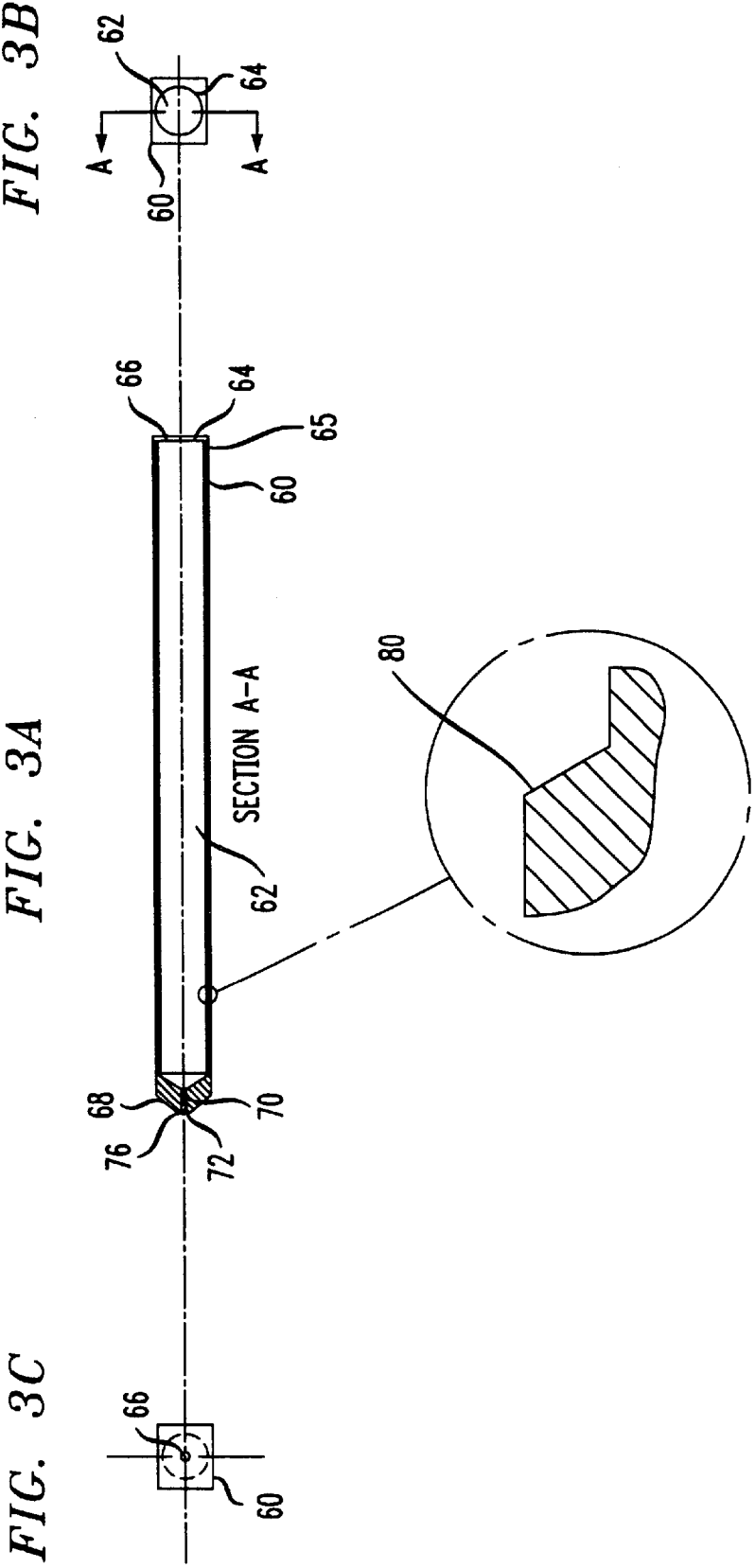

DEVICE PACKAGING AND METHOD

BACKGROUND OF THE INVENTION

1. Field of the Invention

This invention relates to device packaging, for example packaging for a high power optical coupling device.

2. Description of Related Art

In optical communications systems, cladding-pumped fiber devices are important in a variety of applications, for example as amplifiers and lasers. Cladding-pumped fiber devices comprise a cladding-pumped fiber having a single mode core and at least one cladding layer. A major advantage of the cladding-pumped fiber is that it can convert light energy from low brightness sources which is coupled into the cladding of the cladding-pumped fiber into light of high brightness in the core. In a cladding-pumped laser or amplifier, the core is doped with a rare-earth dopant, such as erbium. The pump light in the cladding interacts with the core and is absorbed by the rare-earth dopant. If an optical signal is passed through the pumped core, it will be amplified. In the case of the cladding-pumped laser, the cladding pumped fiber will act as a laser oscillator and convert the pump light to a desired wavelength.

A difficulty preventing full exploitation of cladding-pumped fiber devices involves the problem of efficiently coupling a number of low brightness sources into the cladding of the cladding-pumped fiber device. A common approach is to couple the light from a diode array, such as broad-stripe semiconductor lasers, into multimode fibers using bulk optics to couple the light from the multimode fibers into the cladding-pumped fiber. Another approach involves an optical coupling device which couples light from a diode array, such as a plurality of semiconductor emitters, to a cladding-pumped fiber via tapered fiber bundles fusion-spliced to the cladding pumped fiber. However, in these approaches where light energy of relatively high power (for example, greater than 1 Watt) is being coupled together, the light energy escaping from the optical coupling device can damage the optical coupling device or other devices.

Conventional packaging for optical devices does not adequately protect the higher power (>1 Watt) optical devices against the escaping light energy. Typically, optical devices handle less than 1 Watt of light energy and operate satisfactorily being mounted on metal, glass or ceramic. However, if a high power optical coupling device is mounted on ceramic or metal, the light energy that leaks out can be absorbed by the ceramic or metal and be converted to thermal energy which can damage the optical coupling device, for example by melting or burning up the optical coupling device or by breaking the optical coupling device because of the expansion or contraction of the ceramic or metal due to changing temperature. Using glass packaging for the optical fiber device can solve some of these problems, but the glass packaging is more fragile, and the light energy can escape from the device to potentially damage or interfere with the operation of other devices.

SUMMARY OF THE INVENTION

The present invention provides a packaging system including a medium which transports energy in a first form away from a radiation point in a device to where the energy can be converted to a second form without damaging the device or effecting other devices. In certain embodiments, the medium can inhibit the propagation of energy in the second form. For example, in an optical coupling device, the medium includes a substrate adjacent to the radiation point which transports light energy away from the radiation point to a housing which converts the light energy into thermal energy away from the radiation point. In certain embodiments, the substrate can inhibit the transmission of thermal energy, thereby further protecting the optical coupling device from the thermal energy. Thus, the effect of the thermal energy on the operation of the optical coupling device is reduced as well as the effect of the escaping light energy on other devices.

In accordance with an aspect of the present invention, at least a portion of the device is suspended from a substrate, for example, to protect the device against a third form of energy. For example, in the optical coupling device, the medium includes an air gap which separates the radiation point from the substrate to suspend at least a portion of the device. The air gap enables the device to be protected against the mechanical energy resulting from the expansion or contraction of the packaged device due to changing temperature. In certain embodiments, the housing is provided with at least one opening in which a pliable seal is inserted which can absorb the mechanical energy resulting from the expansion or contraction of the packaged device due to changing temperature. The pliable seal can also prevent light energy from interfering with other devices.

BRIEF DESCRIPTION OF THE DRAWINGS

Other aspects and advantages of the present invention may become apparent upon reading the following detailed description and upon reference to the drawings in which:

FIGS. 1a and 1b shows side and sectional views of an optical coupling device using an embodiment of the packaging according to the principles of the present invention;

FIGS. 2a and 2b show side and front views of the substrate for the packaging embodiment of FIG. 1 according to the principles of the present invention; and FIGS. 3a, 3b and 3c show side, and front end views of an embodiment of the housing for the packaging embodiment of FIGS. 1a and 1b according to the principles of the present invention.

DETAILED DESCRIPTION

An illustrative embodiment of packaging according to the principles of the present invention is described below for an optical coupling device for coupling energy from multiple sources into a cladding-pumped fiber device. In optical communications systems, cladding-pumped devices are important in a variety of applications, for example as amplifiers and lasers. Large capacity optical transmission systems are in general combining multiple wavelengths on a single fiber by means of Wavelength Division Multiplexing (WDM) to fill the available bandwidth. In these WDM optical transmission systems, the cladding-pumped amplifiers, such as rare-earth doped fiber optical amplifiers (such as example erbium or erbium-ytterbium doped) are used to simultaneously amplify the multiple wavelengths. Cladding-pumped lasers can be used to pump Raman lasers which can be used to pump remotely located Erbium amplifiers in repeaterless communications systems and to pump Raman amplifiers. Additionally, cladding-pumped fiber devices have promising applications as light sources for printers, in medical optics and for materials processing.

Cladding-pumped fiber devices comprise a single mode core and at least one cladding layer. The cladding surrounds the core and is typically a silica cladding of large cross-sectional area (as compared to the core) and high numerical aperature. It is usually non-circular to ensure that the modes of the cladding will have good overlap with the core. Typically, an outer layer, which can be referred to as an outer cladding, surrounds the cladding and is commonly composed of a low refractive index polymer. The index of the core is greater than that of the cladding which, in turn, is greater than the outer cladding.

A major advantage of the cladding-pumped fiber is that it can convert light from low-brightness sources into light of high brightness in a single mode fiber. Light from low brightness sources, such as diode arrays producing light typically having wavelengths between 915 to 1000 nanometers with each diode producing 800 milliwatts (mW) of power, can be coupled into the cladding due to its large cross-sectional area and high numerical aperature. In a cladding-pumped laser or amplifier, the core is doped with a rare-earth dopant, such as erbium, ytterbium or erbium-ytterbium. The pump light in the cladding interacts with the core and is absorbed by the rare-earth dopant. If an optical signal is passed through the pumped core, it will be amplified. For example, an erbium-ytterbium amplifier amplifies any light in the pumped core at a wavelength of about 1550 nanometers. In the case of the cladding-pumped laser, the cladding pumped fiber will act as a laser oscillator and convert the pump light to a desired wavelength. For example an ytterbium based cladding pumped laser will convert the light from the multiple sources, for example at 915–1000 nanometers (nm), into light at a wavelength of about 1100 nanometers which can be used to pump a Raman laser which generates light at a wavelength of about 1450–1480 nanometers. Light at 1450 nm can be used to provide Raman amplification. Light at 1480 nm can be used to pump an erbium amplifier.

A difficulty preventing full exploitation of cladding-pumped fiber devices involves the problem of coupling a number of low brightness sources into the inner cladding efficiently. A common approach is to couple the light from a diode array, such as broad-stripe semiconductor lasers, into multimode fibers using bulk optics to couple the light from the multimode fibers into the cladding-pumped fiber. The difficulty with this approach is that it requires a number of fine interfaces with associated problems of matching and alignment. Accordingly, light energy can leak out and reduce the performance of or damage the optical coupling device.

Another approach involves an optical coupling device where light is coupled from a diode array, such as a plurality of semiconductor emitters, to a cladding-pumped fiber via tapered fiber bundles fusion spliced to the cladding pumped fiber. Individual semiconductor broad stripe emitters or diodes can be coupled to individual multimode fibers. The individual fibers can be bundled together in a close-packed formation, heated to melting temperature, drawn into a tapered-down region and fused together. The resulting fused fiber can be spliced to a cladding-pumped fiber such that the light energy from the multiple sources is coupled into the cladding of the cladding-pumped fiber. However, light energy can radiate out at the taper-down region as the multiple sources of light energy are being coupled into the cladding.

Conventional packaging for optical devices does not adequately protect the high power (>1 Watt) optical coupling devices against light energy which leaks out from the device. If a high power optical coupling device is mounted on ceramic or metal, the light energy that leaks out can be absorbed by the ceramic or metal and converted to thermal energy which can melt or burn the optical coupling device. Moreover, the optical coupling device mounted on ceramic or metal can break from the mechanical energy generated by the expansion or contraction of the ceramic or metal due to changing temperature. Using glass packaging for the optical fiber device can solve some of these problems. The glass expands/contracts at the same rate throughout based on changing temperature, and can transmit the leaking light energy away from the radiation point where it becomes less intense as it travels way from the radiation point. However, the glass packaging is more fragile, and the light energy can escape from the device to potentially damage or interfere with the operation of other devices.

FIGS. 1a and 1b show side and sectional views of a packaged optical coupling device 10 where, in accordance with an aspect of the invention, the packaging includes a medium which transports light energy away from a radiation point 12 to where the energy can be converted to a second form without damaging the device. In this embodiment, the medium includes a substrate 14, such as a quartz substrate, adjacent to the radiation point 12 which transports the light away from the radiation point to a housing 16, such as an aluminum housing. The housing 16 absorbs the light energy and converts the light energy into thermal energy away from the radiation point, thereby reducing the effect of the light energy on the operation of other devices and of the thermal energy on the operation of the device. For example, the described embodiment can protect against a temperature increase of greater than 2 degrees celsius. In accordance with an aspect of the present invention, the at least one radiation point or region 12 is suspended from the substrate. In this embodiment, the medium includes a gap 18, such as an air gap, that separates or suspends the radiation point 12 from the substrate 14, thereby allowing the transmission of the escaping light energy to the substrate 14 while suspending a portion of the optical coupling device 10 to protect the optical coupling device, for example from the mechanical energy generated by the contraction/expansion of the optical coupling device components due to changing temperature.

In this embodiment, the optical coupling device 10 receives light from a diode array (not shown) on optical fibers 20 and couples the light on the optical fibers 20 into a cladding of a standard optical fiber 22 which can be readily spliced to a cladding-pumped optical device, such as a cladding-pumped optical fiber laser or amplifier. In this embodiment, the diode array includes a plurality of diodes each of which produces light at a wavelength of about 980 nanometers and at a power level of 800 mW. If the optical fiber 22 is spliced to a cladding pumped laser, the light from each diode is provided to a multimode optical fiber of the optical fibers 20. A multimode fiber is typically constructed with a pure silica core that is surrounded by a silica cladding doped with fluorine, germanium or aluminum. The cladding is doped to lower the index of refraction of the cladding as compared to the core to prevent the light from escaping the core. Typically, the core of the multimode fiber has a diameter of 104 microns that is surrounded by a doped cladding with the outer diameter of the fiber being about 125 microns. If the diode array comprises seven diodes, then each of seven multimode optical fibers 20 is coupled to one of the seven diodes.

If the optical coupling device 10 is spliced to a cladding-pumped optical fiber amplifier, the optical fibers 20 include at least one single mode optical fiber carrying the optical signal(s) to be amplified at a typical wavelength of 1550 nm. Typically, the single mode fiber is the center fiber in the fiber bundle. The single mode fiber typically has a diameter of 125 microns and a single mode, step index core that has a delta of 0.5% and a diameter of 9–12 microns. The single mode core is surrounded by a cladding, which is typically made of silica doped with fluorine, germanium or aluminum, having a lower index of refraction than the core to prevent the single mode light from escaping the core. To provide the pump light for the cladding-pumped amplifier, each diode of the diode array provides light to a multimode fiber of the optical fibers 20. In this embodiment, the at least one single mode optical fiber is surrounded by the multimode fibers, each of which carry the light energy at a typical wavelength of 980 nm and a power level of 800 mW from a diode of the diode array.

In this embodiment, the optical coupling device 10 receives the optical fibers 20 through an opening or open end 25 in the housing 16. The optical fibers 20 are positioned within a channel of the substrate 14. In this embodiment, the optical fibers 20 are coated with a standard high index coating to a diameter of 250 microns. Alternative coatings are possible. Without the high index coating, the bare fibers have a diameter of 125 microns. The coating on the fibers 20 (shown as white) is removed to leave bare fibers 21 (shown in black). At least a portion (for example, a 13 mm portion) of the optical fibers 20 and/or 21 is coated or surrounded by a low index coating 24, such as a low refractive index polymer having a refractive index less than that of the optical fiber or the high index coating, for example a refractive index of 1.37 which is less than the refractive index of the fiber which is made of glass (standard silica) having a refractive index at about 1.42.

The low index coating 24 prevents the light propagating through the optical fiber from escaping. The low index coating 24 pots or adheres the fibers 20 and/or the bare fibers 21 to the substrate 14. The low index coating 24 can be a perfluorinated polyether urethane acrylate. In general, the polymer can be applied onto the glass fiber as a melt or be cast from solution. A liquid monomer or oligomer mixture can be applied and can be polymerized in situ. This polymerization can be initiated simply by mixing reactive co-monomers, by moisture, by air, by heat, or by the action of actinic radiation (preferred). Examples of suitable polymers include fluorinated polymers and silicon-based polymers (siloxanes). The former include partially or fully fluorinated polymers, such as copolymers of perfluoro-2,2-dimethyldioxole and tetrafluoroethylene sold under the tradename TEFLON AF by duPont; ring-cyclized homopolymers of perfluoro(butenyl vinyl ether) sold under the tradename CYTOP by Asahi Glass Co.; terpolymers of tetrafluoroethylene, hexafluoroethylene, and vinylidene fluoride sold under the tradename THV FLUOROPLASTIC by 3M; copolymers of perfluoro-2,2,-dimethyldioxole and chlorotrifluoroethylene; and terpolymers of perfluoro-2,2-dimethyldioxole, tetrafluoroethylene and chlorotrifluoroethylene. Suitable fluorinated polymers further comprise fluoroacrylates and/or their copolymers with hydrocarbon-based (non-fluorinated) acrylates (and/or methacrylates), fluoromethacrylates and/or their copolymers with hydrogen-based (non-fluorinated) acrylates (and/or methacrylates), fluorinated acrylamides, fluorinated urethanes, fluorinated epoxies, fluorinated vinyl ethers, and fluorinated vinyl esters. Mixtures of any of these fluorinated polymers, copolymers or terpolymers further may be used. Fluoroacrylates comprise esters of acrylic acid and perfluorinated or partially fluorinated alcohols, diols, or polyols. Fluoromethacrylates comprise esters of methacrylic acid and perfluorinated or partially fluorinated alocohols, diols, or polyols. Suitable silicon-based polymers include polydimethylsiloxanes, polydiphenylsiloxanes, polymethylphenylsiloxanes, polysilanes, and polysilazanes. The silicon-based polymers further comprise polysiloxanes and polysilsesquioxanes having one or more substituents selected from the group consisting of acrylate, methacrylate, epoxy, amine, vinyl, hydride, silanol, carbinol, carboxylic acid, alkoxysilane having from 1 to 18 carbon atoms, and mercaptan. Copolymers or mixtures of any of these silicon-based polymers also may be used. In the case of fluorine-containing polymers, the refractive index can be adjusted by changing the relative fluorine content in the polymer. In the case of siloxanes, the refractive index can be adjusted by changing the ratio of methyl to phenyl groups attached to the siloxane chain.

A restraint or tube 26, such as a teflon tube (for example, 2 mm long), is used to more tightly bundle or secure the bare optical fibers 21 together, for example in a closely packed formation wherein the interior fibers contact the maximum number of neighboring fibers. In this embodiment, the tube 26 is on the substrate 14 and is at least partially surrounded by the low index coating 24. The low index coating 24 and/or the teflon tube 26 support the fibers 20 and/or 21 in a fiber bundle 28 separated from the substrate 14. In this embodiment, the closely packed fibers exit from the low index coating 24 and are bare fibers suspended from the substrate 14 by the air gap 18 which separates the bare fibers from the substrate 14.

The fiber bundle 28 is tapered to a cross-section with a reduced diameter, for example to a diameter approximating the diameter of a standard optical fiber of 125 microns. To taper the bare fiber bundle 28, the fibers are melted and drawn to a final diameter, for example 125 microns. Due to the deformation of the fibers during the drawing process, the central fiber need only be tapered by a factor of the square root of seven (i.e. 2.646) in order for a seven fiber bundle to melt into a 125 micron diameter cylinder. The heating of the fibers can be accomplished using a variety of approaches including direct flame, a baffled flame, an electric furnace, a plasma laser or $CO_2$ laser. The ends of the fibers are rigidly mounted to translation stages that are translated at different speeds in order to create the taper as would be understood by one of ordinary skill in the art.

In this embodiment, the fibers in the fiber bundle are fused together in forming the taper 12, which can be referred to as a coupling or transition region 12 and is referred to above as a radiation point. Due to the changing physical configuration in the taper region 12, light energy is apt to escape and radiate from the taper region 12 since light energy from the multiple sources on the multiple fibers are being coupled together into a single fiber. In the embodiment of FIG. 1, the taper region 12 begins 15 mm from an end of the teflon tube 26 and is about 3–5 mm long. The taper region 12 is about 25 mm from the beginning of the low index coating 26. Once the fiber bundle 28 is tapered to the desired diameter, the resulting fused fiber 30 is drawn at a uniform diameter to form a length of the fused fiber 30, for example a length of 5–10 mm. A splice 32 splices the fused fiber 30 to an optical fiber 23, such as a standard optical fiber, for example a 5D optical fiber. The fused fiber 30 can be cleaved and fusion spliced to the optical fiber 23.

If the optical fiber 22 is to be spliced to a cladding pumped laser, the light energy in the multimode fiber regions of the fused fiber 30 is coupled into the cladding of the optical fiber 23 and 22 which in turn is coupled into the cladding of the cladding pumped fiber laser. Depending on the parameters of the optical fiber 23 and the multimode fibers in the bundle 28, there is a minimum cross-sectional area below which the region 12 should not be tapered. At lower areas, losses are excessive.

If the optical fiber is to be spliced to a cladding pumped fiber amplifier, it is important that the single mode core of the at least one single mode fiber in the bundle 28 which is fused in the fused fiber 30 be capable of fusion splicing with low loss to the standard single mode fiber 23 after the taper region 12. For a given delta, there is a core diameter at which the mode field diameter is at its minimum. For a given degree of tapering, a tapering fiber can be designed such that the mode will have a good overlap with the optical fiber 23 after tapering. For example, if the diameter of the central fiber in the bundle 28 is to decrease by a factor of three in the tapered region 12, and the central fiber is to be spliced onto a standard step index fiber with a delta of 0.32% and a core diameter of 8 microns at a wavelength of 1.55 microns, a tapering fiber with a delta of 0.5% and an initial core diameter of 12 microns yields low splice loss. In this example, the tapering fiber remains single moded throughout the taper region.

In the embodiment of FIGS. 1*a* and 1*b*, after the taper region 12, the fused fiber 30 remains suspended from the substrate 14 by the air gap 18. The fused fiber 30 is spliced to a standard bare optical fiber 23. After the splice 32, the standard optical fiber 23 (shown in black) is suspended by the air gap 18 and a low index coating 36 which supports the bare optical fiber 23 apart from the substrate 14. The bare optical fiber 23 is coated by a low index coating and becomes the coated standard optical fiber 22 (shown in white). In this embodiment, the bare optical fiber 23 is coated by a low index coating after entering the low index coating 36. At least a portion of the bare fiber 23 and/or the coated fiber 22 is coated or surrounded with the low index coating 36 before the optical fiber 23 exits from the housing 16 to be spliced to a cladding pumped fiber device. The low index coating 36 can be a low index polymer, as used in the low index coating 24 but not necessarily the same one, to prevent light energy from escaping the optical fiber 22 and/or 23. In conjunction with the low index coating 24 and/or the teflon tube 26, the low index coating 36 supports the optical fiber 23 to create the air gap 18 between the substrate 14 and the radiation point 12, thereby suspending at least a portion of the optical coupling device. In this embodiment, the air gap 18 created at least in part by the low index coatings 24 and 26 is about 24 mm long and suspends the taper region 12, at least a portion of the fiber bundle 28, the fused fiber 30, the splice 32 and a portion of the optical fiber 23.

The packaging includes the substrate 14, which can be made of quartz, and the housing 16 which can be made of black anodized aluminum. As the light energy is coupled from the multiple sources into the optical fiber 23, some light energy escapes. For example, in the optical coupling device 10, light energy is known to leak out at the taper region or radiation point 12. Depending on the apparatus or embodiment, other radiation points can exist, for example at interfaces, transitions, coupling or active regions, such as the splice 30. The packaging according to principles of the present invention has a medium which includes at least the substrate 14 which transports the light energy away from the radiation point 12 to the housing 16. The housing 16 absorbs the energy and transforms the light energy into thermal energy. Because the light energy is transported away from the radiation point, it spreads and is less intense when absorbed by the housing 16. Additionally, because the thermal energy is spaced away from the radiation point, the thermal energy is even less likely to damage the optical fiber. Thus, the packaging according to the present invention prevents energy in a first form, such as light energy, from being converted into a damaging second form, such as thermal energy, in close proximity to the radiation point in the device handling the power in the first form, for example the optical coupling device. Additionally, the medium can provide protection against the energy in the second form. For example, the quartz substrate can transmit the optical energy but not readily transmit the thermal energy or act as an insulator against the thermal energy.

In accordance with an aspect of the present invention, in absorbing the light energy, the housing 16 prevents the light energy from leaking out and effecting other optical devices. In this embodiment, a seal 38, such as a black seal or plug of standard silicone adhesive, is inserted into an opening in the housing 16 where the optical fibers 20 enter into the housing 16 to prevent light from leaking out of the housing 16.

In accordance with another aspect of the present invention, the packaging is designed to protect the device components from mechanical; energy, for example the energy generated by the expansion and/or compression of the device components due to changing temperature. In this embodiment, the optical coupling device 10 must operate at least between 40 degrees celsius and 85 degree celsius. If the thermal energy from leaking light energy is great enough, the temperatures can exceed that temperature range. To handle the expansion and compression of the various components in the optical coupling device without a failure, such as a break in the optical fiber(s), a gap or suspension layer, such as the air gap 18 can suspend at least a portion of the optical fibers 20, the bundled fibers 28, the taper region 12, the fused fiber 30, the splice 32 and/or the standard fiber 23. By suspending portions of the optical coupling device 10, those portions are protected against the forces resulting from the expansion/compression of the components of the optical coupling device 10 over the temperature range. For example, by spacing the components of the optical coupling device 10 from the substrate 14, for example by 15–25 mm, the suspended fiber(s) can slightly bend or deform without breaking over the temperature range. In certain embodiments, the medium can include the air gap or suspension layer 18 which both transmits the light energy and tends to protect or isolate the suspended portions of the device from the mechanical and/or thermal energy.

Additionally, the seal 38 can be of a pliable adhesive which is able to flex due to the changing forces from the expansion/compression of the components in the optical coupling device over the temperature range and reduce the effects of mechanical energy on portions of the optical coupling device. In this embodiment, the seal 38 is a light-absorbing, pliable adhesive which is able to absorb mechanical energy, for example generated by the expansion/contraction of the components of the optical coupling device due to changing temperature, and prevent light energy from escaping from within the housing 16. Moreover, using a quartz substrate or other material which expands/contracts at the same rate throughout the substrate 14 protects the components from the stresses and strains due to changing temperature. In this embodiment, the quartz substrate 14 expands/contracts at a uniform rate throughout to reduce the mechanical energy adversely effecting the optical coupling device components and transports light energy away from a radiation point to be converted to thermal energy where the damage due to the thermal energy is reduced.

FIGS. 2*a* and *b* show more detailed side and front views of an embodiment of the substrate 14 for the packaged optical coupling device 10 of FIG. 1. In this embodiment, the substrate 14 is made of a quartz cylinder in which a channel 52 or hollow tube is formed along the length of the substrate 14. In this embodiment, the channel 52 is formed by removing a 60 degree+/−2 degrees sector of the cylinder 50 along with a hollowed out portion at the center of the cylinder. For example, the cylinder is 0.155–0.157 inches in diameter, and the hollowed out portion at the center of the cylinder is 0.04 inches+/−0.005 inches wide and 0.020 inches+/−0.003 inches up from the center of the cylinder. The remaining hollowed out portion is a semi-circle from the down from the center of the cylinder 50.

In this embodiment, the substrate 14 is 1.875 inches long+/−0.010 inches with no sharp edges and provides support for the optical fiber(s) or portions of the optical coupling device carrying the light energy. The channel 52 is sufficiently dimensioned to accommodate the optical fibers 20 (FIG. 1) with the low index coating 24, the suspended fiber bundle 28 (FIG. 1), the suspended tapered region 12 (FIG. 1), the suspended fused fiber 30 (FIG. 1), the suspended splice 32 (FIG. 1) the suspended bare optical fiber 23, and the coated optical fiber 22 with the low index coating 36 (FIG. 1). Depending on the embodiment, the substrate 14 could be dimensioned differently, and a low index coating or different support or coating could cover different portions or all of the fiber regions within the channel 52. As such, the medium for transmission of the optical energy can include the air gap 18 (or other suspension layer), the low index coating and/or the substrate 14. Additional or different coatings, layers, supports, gaps or substrates can be included as part of or in addition to the medium.

FIGS. 3a and b show more detailed side and front views of an embodiment of the housing 16 for the packaged optical coupling device 10 of FIG. 1. In this embodiment, the housing 16 is made of a metal, such as aluminum with black anodize, or another material which absorbs light energy and converts the light energy to thermal energy which can be readily dissipated. In this embodiment, the housing 16 is made of an aluminum with black anodize rod 60 with a square cross-section, for example 0.188 inches by 0.188 inches, and a cavity or hollowed portion 62 having a circular cross-section and a cylindrical shape which runs along a length of the metal rod 62. In this embodiment, the cavity 62 starts at an opening 64 which has a diameter of 0.1595 inches at a first end 65. The opening 64 has a rim 66 where the edges of the opening 64 are tapered to form an angle of 82 degrees. In this embodiment, the opening 64 tapers down to a diameter of 0.1575, and the cavity 62 runs for 2.0 inches to where the cavity tapers down to form a 118 degree angle to a cylindrical opening 70, cavity or tunnel which has a diameter of 0.0135 inches+/−0.001 inches and passes through a second end 68 to a tapered opening 72 formed about the edge of the opening 70 such that the opening 70 tapers out at an angle of 82 degrees to a diameter of 0.030 inches. From the outer edge 76 of the tapered opening 72 at the tip of the second end 68 of the housing 16, the housing 16 tapers out at 45 degrees to the diameter of the housing 16 at 0.188 inches. From the tip of the second end to the outer edge of the opening 64, the housing 16 of this embodiment is 2.125 inches in length.

As can be determined by the dimensions of this embodiment, the substrate 14 fits within the cavity 62 of the housing 16 such that the optical fibers 20 (FIG. 1) enter the housing 16 at the opening 64 at the first end 66, and the optical fiber 22 exits the housing through the opening 70 out the tapered opening 72 at the second end 68. The seal 38 (FIG. 1) is used to plug up the opening 64 to protect the interior components of the housing 16 and prevent light from escaping out of the housing 16. Additionally, the pliable seal 38 at the opening 64 can absorb forces from the compression and expansion of the housing, the substrate and internal components over a wide temperature range. In this embodiment, as shown by the magnified view a step 80 on the interior of the housing 16, such as a 0.001 inch step, acts as a stop or positioning guide for the substrate 14. As such, when the substrate 14 is slid into or positioned within the housing 16, the substrate 14 is held against the step 80, or the step 80 stops or positions the substrate 14 within the housing 16.

Thus, for a device handling energy in a first form (such as optical energy), packaging according to principles of the present invention reduces the burning up or damaging of the device by energy in a second form (such as thermal energy) which was converted by energy leaking from the device in the first form. To do so, the packaging includes a medium to propagate the energy in the first form away from the point of radiation to be converted to energy in the second form to be dissipated. By using a housing to absorb the energy in the first form and convert the energy into a second form, the housing prevents the energy from radiating out from the packaging in the first form to potentially interfere or damage any devices or components outside the packaging. Additionally, in certain embodiments, an air gap and/or low index coating is used to suspend or support the operational components of the device, such as the high power optical coupling device, to reduce any damage due to the compression and expansion of the packaging and device components over a wide temperature range. To this end, a pliable seal can be used to seal the openings in the housing.

Alternative configurations of the packaging system are possible which omit or add components or use different components in performing the above-described packaging scheme or a variation thereof. For example, in addition to a medium comprising an air gap and a substrate, other embodiments of the medium are possible which include a substrate alone or a substrate with additional and/or different material(s), layers and/or gaps which transmit the energy in the first form. Moreover, the housing of the packaging embodiment described above is a metal housing, but the housing can be made of additional and/or different material (s), gaps, layers and/or structures so long as the housing absorbs the energy in the first form to convert the energy to a second form a distance from the radiation point. Embodiments of the packaging can use the housing to dissipate the energy in the second form.

The above-described packaging embodiment involves a high power (greater than 1 Watt) optical coupling device for a cladding pumped optical fiber device, such as an Erbium-doped fiber amplifier or laser, but the packaging system of the present invention can be used with other optical devices in which leaking optical energy can convert to thermal energy to damage the operating components of the device. Alternatively, the packaging system can be used in other devices handling energy in a first form which can leak out and be converted to energy in a second form which can damage the operational components of the device or which can leak out to effect other components in the first and/or second form. Furthermore, embodiments of the packaging system can be used to protect operational components in a power handling device from energy in a third form, such as mechanical energy or forces caused by the expansion/contraction of the device due to changing temperature. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method for coupling light from a plurality of optical fibers into an optical fiber comprising the steps of:

transporting, in a medium having at least one air gap contacting a radiation point that is located between said plurality of optical fibers and said optical fiber, light which is not coupled into said optical fiber and radiates from said radiation point; and converting, at a distance from said radiation point, said light from said medium into thermal energy.

2. The method of claim 1 wherein said step of converting includes the step of:

absorbing said light from said medium to produce said thermal energy.

3. The method of claim 1 further including the step of:

providing at least a substrate adjacent to said air gap.

4. The method of claim 3 wherein said substrate is made of quartz.

5. The method of claim 3 wherein said medium includes said air gap between said radiation point and said substrate.

6. The method of claim 1 further including the step of:

providing a housing being made of metal to convert light to said thermal energy.

7. The method of claim 6 wherein said housing is made of aluminum with black anodize.

8. The method of claim 7 further including the step of:

providing a black seal in an opening of said housing.

9. The method of claim 5 including the steps of:

coating a portion of at least one optical fiber with a low index coating; and forming said air gap at a portion of at least one optical fiber which is not coated and includes said radiation point.

10. The method of claim 9 wherein said optical fiber is coupled to a cladding pumped optical fiber device.

11. Packaging for a device for coupling light from a plurality of optical fibers into an optical fiber, said packaging comprising:

a medium having at least one air gap contacting a radiation point that is located between said plurality of optical fibers and said optical fiber, said medium adapted to transport said light which is not coupled into said optical fiber and radiates from said radiation point; and a housing a distance from said radiation point adapted to convert said light from said medium into thermal energy.

12. The packaging of claim 11 wherein said housing adapted to absorb said light from said medium to convert to said thermal energy.

13. The packaging of claim 11 wherein said medium including:

a substrate adjacent to said air gap adapted to transport light.

14. The packaging of claim 13 wherein said substrate is made of quartz.

15. The packaging of claim 14 wherein said air gap is between said radiation point and said substrate.

16. The packaging of claim 11 wherein said housing is made of metal to convert light from said medium to said thermal energy.

17. The packaging of claim 16 wherein said housing is made of aluminum with black anodize.

18. The packaging of claim 17 further including:

a black seal in an opening of said housing.

19. The packaging of claim 14 wherein said device is an optical coupling device including at least one optical fiber with a low index coating; and said air gap is formed at a portion of at least one optical fiber which is not coated and includes said radiation point.

20. The packaging of claim 19 wherein said optical coupling device is to be coupled to a cladding pumped optical fiber device.

* * * * *